United States Patent [19]

Noack et al.

[11] 4,224,041
[45] Sep. 23, 1980

[54] APPARATUS FOR THE THERMAL REGENERATION OF LOADED ADSORBENTS

[75] Inventors: Rolf Noack; Friedhelm Fröhlich; Stefan Gramelt, all of Oberhausen; Gerhard Kmoch, Bochum, all of Fed. Rep. of Germany

[73] Assignee: Deutsche Babcock Aktiengesellschaft, Oberhausen, Fed. Rep. of Germany

[21] Appl. No.: 959,368

[22] Filed: Nov. 9, 1978

[30] Foreign Application Priority Data

Nov. 4, 1977 [DE] Fed. Rep. of Germany ....... 2749399

[51] Int. Cl.² .............................................. B01D 53/08
[52] U.S. Cl. ....................................... 55/208; 55/390; 422/216
[58] Field of Search ......................... 55/181, 208, 390; 422/106, 144, 145, 146, 206, 216

[56] References Cited

U.S. PATENT DOCUMENTS

| | | | |
|---|---|---|---|
| 2,530,274 | 11/1950 | Weber | 422/206 |
| 2,548,912 | 4/1951 | Savage | 422/216 X |
| 2,553,561 | 5/1951 | Evans | 422/216 X |
| 2,755,174 | 7/1956 | Weber | 422/206 |
| 2,904,518 | 9/1959 | Shea | 422/216 X |
| 3,086,852 | 4/1963 | Fenske et al. | 422/206 X |
| 3,700,563 | 10/1972 | Karweil et al. | 422/144 X |
| 4,046,530 | 9/1977 | Izumo et al. | 55/208 X |

FOREIGN PATENT DOCUMENTS 1719554 10/1970 Fed. Rep. of Germany .............. 55/208

Primary Examiner—Robert H. Spitzer
Attorney, Agent, or Firm—Max Fogiel

[57] ABSTRACT

An apparatus for thermal regeneration of loaded adsorbents by a hot solid heat carrier consisting of a container having a head and a base. The head holds feed pipes for the adsorbent and the heat carriers and the base has a discharge unit. A bottom arrangement of pipes is located underneath these feed pipes. A gas feed duct is located outside this container and connected to the bottom arrangement of pipes which has gas outlet nozzles. The pipes in this bottom arrangement of pipes are spaced apart by a multiple of the grain diameter of the absorbents and the heat carrier. The gas outlet nozzles may be directed downwardly. Outlet connections for desorption gas in the head may lead to the gas feed duct. The bottom arrangement of pipes may be located in the upper portion of the container and a filling level meter may be electrically connected through a regulating circuit to the discharge unit above the bottom arrangement of pipes. The feed pipe for the adsorbent may protrude into the layer above the bottom arrangement of pipes. A dust separator may be located in the head in front of the opening of the outlet connection for the desorption gas.

8 Claims, 1 Drawing Figure

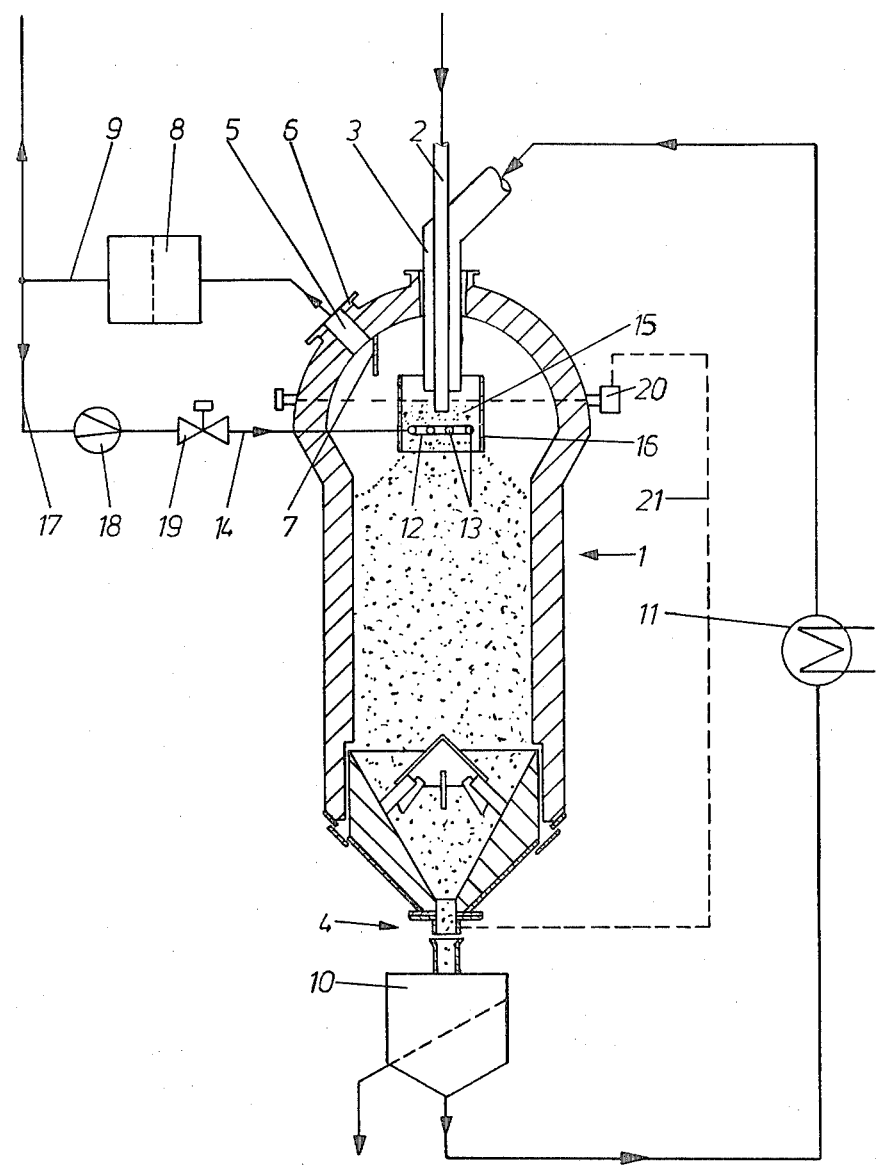

APPARATUS FOR THE THERMAL REGENERATION OF LOADED ADSORBENTS

BACKGROUND OF THE INVENTION

The invention concerns an apparatus for the thermal regeneration of loaded adsorbents with the aid of a hot solid heat carrier, consisting of a container, the head of which is provided with feed pipes for the adsorbent and the heat carrier and the bottom of which displays a discharge device.

An apparatus of that kind is used for the process according to the German Pat. No. 1719554. This process is used for the thermal regeneration of activated carbon or activated coke gas granulate from the flue gas desulphurization, where sand in a granulation of less than 1 millimeter is used as heat carrier. The solid material mixture consisting of the adsorbent and the hot sand travels through the container continuously as travelling bed. Although this regeneration entails the advantage that the expelled desorption gas is not polluted by foreign gas, it presents certain difficulties to mix the sand and the adsorbents homogeneously and to attain a good heat transfer.

Although the heat transfer is better in the thermal regeneration of adsorbents in a stationary layer, a travelling layer or an eddy layer by conducting hot gases therethrough, the desorption gas is diluted by the hot gas component.

The present invention, therefore, turns to the regeneration with the aid of a solid heat carrier. It has the object of further developing an apparatus of the initially mentioned kind in such a manner that the heat transfer from the heat carrier to the adsorbent is increased and the intermixing of the two components is improved.

Another object of the present invention is to provide an arrangement of the foregoing character which is substantially simple in construction and may be economically fabricated.

A further object of the present invention is to provide an installation, as described, which may be readily maintained in service and which has a substantially long operating life.

SUMMARY OF THE INVENTION

The objects of the present invention are achieved by locating underneath the feed pipes for the adsorbent and the hot sand a bottom of pipes, which is connected with a gas feed duct external to the container and is provided with gas outlet nozzles, where the pipes are disposed at a spacing, which corresponds to a multiple of the grain diameter of the adsorbents and the heat carrier, respectively.

The turbulent gas blown in through the pipes of the bottom causes a turbulence of the layer, present above the bottom, of adsorbents and heat carriers. An intensive intermixing of the solid materials and heat transfer coefficients higher by the factor of 5 to 6 compared with a travelling bed is attained through this turbulence.

To avoid a dilution, the previously expelled desorption gas can be used as turbulent gas. For this, the outlet pipe connection, provided in the head of the container, for the desorption gas is, in a further development of the invention, connected with the gas feed duct to the pipes of the bottom. The solid material mixture of adsorbents and heat carriers is continuously guided through the container at a controlled speed. For this purpose, a filling level meter, which is electrically connected through a regulating circuit with the discharge device, is provided above the bottom.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

A longitudinal section through an apparatus according to the present invention.

DESCRIPTION OF THE PREFERRED EMBODIMENTS

The illustrated apparatus serves for the thermal regeneration of loaded adsorbents containing carbon, in the present case of activated coal or activated coke granulate from the flue gas desulphurization, with the aid of a solid hot heat carrier, in the present case of sand in a granulation of less than 1 millimeter. The equipment according to the present invention can also be used for the thermal regeneration of adsorbents containing material other than carbon. The apparatus consists of an internally brick-lined container 1, through the head of which are led two feed pipes 2 and 3. The feed pipes 2 and 3 are arranged concentrically, the activated coke being charged through the inner feed pipe and the sand through the outer feed pipe 3.

Activated coke and sand travel as mixture of solid matter downwardly through the container 1 and are drawn off continuously through a discharge device 4 arranged in the base. A travelling bed, which is supported on the base of the container 1, thus forms in the container 1.

Through the contact with the hot sand, the activated coke is heated to desorption temperature and the gaseous components adsorbed in the activated coke are then released. This desorption gas issues from the surface of the pile and is conducted away through an opening 5 and an outlet pipe connection 6 in the head of the container 1. A dust separator 7 is provided in front of the opening 5. After leaving the container 1, the desorption gas flows through a filter 8 and is conducted through the duct 9 to a further processing plant.

Connected downstream of the discharge device 4 is a filter machine 10, on which the sand is separated from the activated coke. The desorbed activated coke is fed to the adsorber of the flue gas desulphurization plant. The sand gets to a heater 11, in which it is heated up to the necessary temperature with the aid of hot inert gas. The hot sand is then conveyed through a pipe duct to the feed pipe 3.

A horizontal bottom 12 of pipes 13 is arranged in the upper part of the container 1 at a spacing underneath the feed pipes 2 and 3. The pipes 13 display downwardly directed gas outlet nozzles. They are connected to a gas feed duct 14, through which a turbulent gas is blown in. Through the turbulent gas issuing out of the nozzles, a turbulence of the solid matter present in the layer 15 above the bottom 12 is effected.

The pipes 13 of the bottom 12 are disposed at a spacing from one another, which corresponds to a multiple of the grain diameter of the coarser solid material, in the present case the activated coke. For cylindrical briquettes of activated coke with a diameter of 9 millimeters and a length of 9 millimeters, a bottom of pipes, which displayed a diameter of 45 millimeters and a clear spacing of 45 millimeters from one another, was used in a prototype trial. Through the gaps between the pipes 13, the mixture of solid matter can travel through the bottom 12 out of the layer 15 above the bottom 12. The height of the layer 15 thus lets itself be regulated by the discharge device 4.

The bottom 12 is surrounded by a cylinder 16 of smaller diameter than the internal diameter of the container 1. The mixture of solid matter issues out of the cylinder 16 in the form of a free heaping. The inner feed pipe 2 protrudes into the layer 15.

To avoid a dilution of the desorption gas, a partial stream of this desorption gas is used as turbulent gas. For this, a branch duct 17 branches off from the duct 9 conducting the desorption gas. This branch duct 17 is connected with the gas feed duct 14. It contains a blower 18 for pressure increase and a blocking valve 19.

The height of the layer 15 is measured by a filling level meter 20 consisting of a transmitter and a receiver. The pulses of the filling level meter 20 are transferred through a regulating circuit 21 (only suggested in the FIGURE) to the drive of the discharge device 4. In this manner, the height of the layer 15 lets itself be regulated through the discharge device 4.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. Apparatus for thermal regeneration of loaded adsorbents by a hot solid heat carrier, comprising: a container having a head and a base, said head having feed pipes for said adsorbent and said heat carrier, said base having discharge means; a bottom arrangement of pipes located underneath said feed pipes; a gas feed duct outside said container; said gas feed duct being connected to said bottom arrangement of pipes, said adsorbents and said heat carrier having a grain diameter; said bottom arrangement of pipes having gas outlet nozzles; said bottom arrangement of pipes having a spacing of pipes corresponding to a multiple of the grain diameter of said adsorbents and said heat carrier to inhibit downward migration of a layer of said adsorbents and said heat carrier, said bottom arrangement of pipes being below the surface of said adsorbents and said heat carrier, turbulent gas blown through said bottom arrangement of pipes producing turbulence of adsorbents and heat carrier above said bottom arrangement for substantial intensive intermixing of solid materials and heat transfer factors.

2. Apparatus as defined in claim 1 wherein said gas outlet nozzles are directed downwardly.

3. Apparatus as defined in claim 1 including an outlet means for desorption gas in said head of said container, said outlet means being connected to said gas feed duct.

4. Apparatus as defined in claim 1 wherein said bottom arrangement of pipes is located in the upper portion of said container.

5. Apparatus as defined in claim 1 including a filling level meter electrically connected through a regulating circuit to said discharge means above said bottom arrangement of pipes.

6. Apparatus as defined in claim 1 wherein one of said feed pipes for the adsorbents protrudes into a layer above said bottom arrangement of pipes.

7. Apparatus as defined in claim 3 including a dust separator located in said head of said container in front of an opening of said outlet means for desorption gas.

8. Apparatus as defined in claim 1, including outlet means for desorption gas in said head of said container, said outlet means being connected to said gas feed duct, said gas outlet nozzles being directed downwardly, said bottom arrangement of pipes being located in the upper portion of said container; a filling level meter electrically connected through a regulating circuit to said discharge means above said bottom arrangement of pipes for guiding continuously the solid material mixture through the container at a controlled speed, one of said feed pipes for the adsorbents protruding into the layer above said bottom arrangement of pipes; and dust separator means located in said head of said container in front of an opening of said outlet means for desorption gas.

* * * * *